April 30, 1940.  C. E. McMANUS  2,198,630
CONTAINER
Filed June 14, 1935
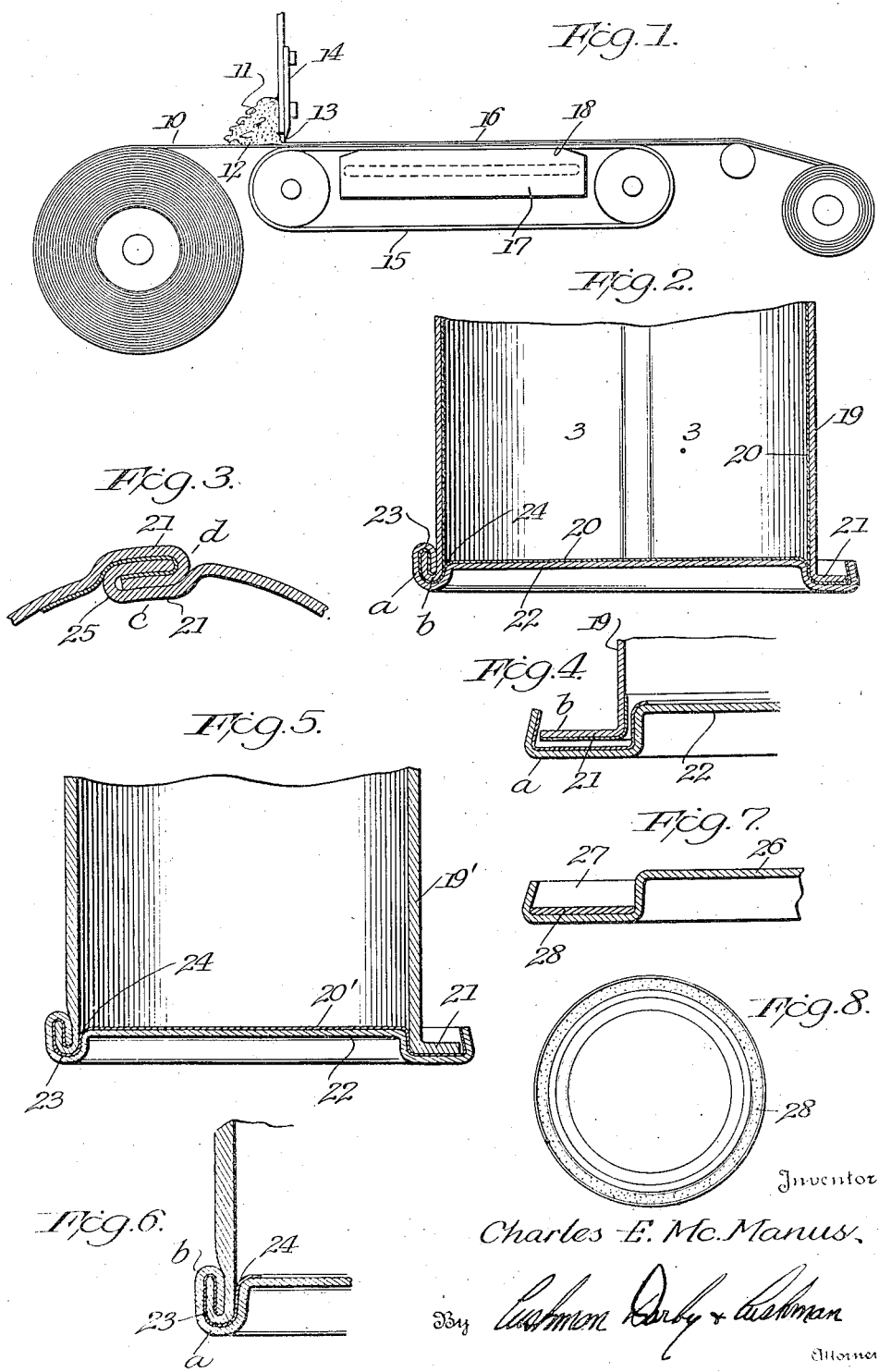
Inventor
Charles E. McManus,
By Cushman, Darby & Cushman
Attorneys Patented Apr. 30, 1940

2,198,630

UNITED STATES PATENT OFFICE 2,198,630

CONTAINER

Charles E. McManus, Spring Lake, N. J., assignor, by mesne assignments, to Crown Can Company, Philadelphia, Pa., a corporation of Pennsylvania Application June 14, 1935, Serial No. 26,679

3 Claims. (Cl. 220—64)

This invention relates to containers, container closures, and their method of manufacture.

Heretofore it has been the general practice to provide the interior of metal containers with a protective lacquer and to use a common solder for sealing the seam or other joint.

I have discovered that by providing the exposed surface of the container with an adherent film or layer of chlorinated rubber, that the container will have a much wider range of usefulness as a packaging means for foods, medicines and chemicals. The film or layer of chlorinated rubber is acid and alkali resistant and resistant to most solvents, tasteless and odorless, moisture and water resistant, substantially impermeable to liquids and gases, and can be formed as relatively thin and transparent adherent films.

Of particular importance, the thin adherent protective coating of chlorinated rubber can be applied to a paper or metal container blank by very simple operation and possesses the property of remaining in continuous phase for long periods of time, in the presence of the contents or when exposed to a wide variety of climatic conditions.

Moreover, the thin adherent film of chlorinated rubber is a very satisfactory sealing material for the seam of a metal container and may be used in place of the usual solders, both for the side seam and for the end seams. In the case of a paper container, the chlorinated rubber is useful to seal the joint between the bottom or top and the body of the container whether the top and bottom be of metal or paper, or other fabricated material.

In the use of the chlorinated rubber as the sealing means for the seam or other joint in a container, the film for forming the seal may be coextensive with the interior layer upon the body of the container or upon the top and bottom of the container so that it is unnecessary to employ two separate materials, namely a liner and a solder, as is frequently the case. If desired, the chlorinated rubber may be used also to provide a seal at the seam or other joint in the container without the use of the chlorinated rubber as a liner, or where it is not desired to use chlorinated rubber but some other conventional type of protective coating.

Referring to the drawing:

Figure 1 illustrates one method of applying a liner material such as chlorinated rubber to a container sheet material such as paper or metal.

Figure 2 illustrates a sectional view, partly broken away, of a metal can, the sides and bottom walls of which are lined with the chlorinated rubber and the seam sealed with the continuous coat of this material.

Figure 3 is a detail view in section taken on the line 3—3 of Figure 2 and showing a side seam of the metal receptacle provided with a sealing layer of chlorinated rubber also continuous with the protective film.

Figure 4 is a sectional view showing a bottom seam before its formation and in which either edge portion of the bottom or of the side wall of the container, or both, may be provided with a layer of the sealing material.

Figure 5 is a view in section broken away of a container, the body portion of which is made of paper, and the bottom of metal lined with a layer of chlorinated rubber which also forms the sealing material at the seam between the bottom and body of the container.

Figure 6 is a detail view showing a seam between the bottom and side wall of the container of Figure 5 when the bottom or side wall thereof is not provided with a layer of the chlorinated rubber, but the edge portion or portions of the joint are formed with an adherent layer of the sealing material, as shown and described in connection with Figure 4.

Figure 7 shows a sectional view partly broken away of a can end having the sealing material of chlorinated rubber flowed into the groove thereof, and Figure 8 is a top elevation of the can end shown in Figure 7.

Referring to the drawing, there is illustrated at 10, a roll of sheet material such as metal or paper which is travelled beneath a spreadable plastic mass 11 of the chlorinated rubber coating material of homogeneous composition disposed on the sheet as at 12 and which is applied to the surface of the sheet material 10 as shown at 13 and spread evenly thereover by means of a doctor blade 14 to form a film of any desired thickness in which the chlorinated rubber is present throughout the thickness of the coating. The sheet material is continuously drawn past the spreadable plastic mass and doctor blade 14 and is suitably supported in its travel by a continuously moving belt 15 or other instrumentality.

The chlorinated rubber 11 is in a flowable and spreadable condition and is preferably formed as a relatively thin transparent, adherent film 16 upon the surface of the sheet material 10, being then suitably cured or dried and thoroughly adhered to the base layer 10 through the medium of a heating instrumentality 17 which may be an oven or simply a heated plate member 18 over which the composite laminated sheet is drawn. Also, in some cases the setting of the film as just described will be accomplished by the use of pressure, or heat and pressure.

The composite sheet material consisting of a layer of metal or paper and a film or layer of chlorinated rubber is now ready for fabrication into metallic or paper receptacles, such as tin cans and paper cartons of various shapes and contours.

Referring to Figure 2, for example, a metal can or other receptacle body 19 is formed from the composite sheet material, and thereby provided with an inner exposed resistant and protective layer of chlorinated rubber 20. This layer is permanently adherent and continuous and covers the entire interior of the can as well as the edge portions 21 of the metal blank employed in forming the seam, i. e., the usual top, bottom and side seams of the can.

The lower seam portion or edge of the body 19 being thus provided with a layer of the chlorinated rubber continuous with the film 20, when the metal bottom 22 and wall 19 are seamed in the usual manner, there will be provided a layer of the chlorinated material between the folded ends a and b of the bottom and side wall forming the seam, as shown at 23. By a slight fusing, i. e., applying heat to the seam portions before or after folding, the portion of chlorinated material 23 of the seam becomes tacky to completely fill and seal the same, and the joint 24 between the bottom and body of the can. The material on cooling resumes its non-tacky state.

It is preferred that the can ends, i. e., the preformed bottom 22 and/or top as formed for subsequent application to the container body be likewise provided with an overall adherent layer or film 20 of the liner material. The continuous sealing portion 23 of the chlorinated rubber film of the can end unites or combines integrally with a similar portion 23 of the can body under mild heating for sealing the seam, as above described. In some cases the sealing portion 23 may be present only on one or the other of the seam edges a and b of the side wall and bottom, but it is preferred to have the continuous sealing portion on both seam edges.

Referring to Figure 3, I have shown the side seam 25 of a metal receptacle, e. g., that of Figure 2 provided with an adherent sealing layer of chlorinated rubber 23 which is preferably continuous with the liner film 20. This sealing layer, however, may be separately interposed and/or adhered between the adjacent seam edges c and d of the container, as shown in Figure 4.

In Figure 4, the container is shown as having an adherent layer or film of the liner and sealing material applied only to each of the seam edges a and b of the can body and can end respectively. In such cases, the overall liner film 20 on the body and/or can ends may be omitted and a layer of the sealing material simply placed upon and adhered to one or the other or preferably both of the seam edges for forming the bottom seam of the container, as shown.

While I have referred to a metal can, i. e., having a metal bottom and ends, it is to be understood that paper cans and containers, as well as receptacles of other materials, will be similarly constructed. In this connection, the can body may be of paper and the ends of metal, or the ends of paper and the can body of metal, or the body and ends of paper. Also, the body may be lined with the chlorinated rubber film and the can ends either uncoated and possessing a resistant characteristic or coated with some other protective material, or the ends may be coated with the chlorinated rubber film and the body uncoated or having a protective characteristic, or a coating of some other resistant material. Where both the body and ends are not provided with an overall resistant and adherent layer of chlorinated rubber, a construction as shown in Figure 4 may be employed in order to provide a layer 23 of chlorinated rubber as the sealing material for the seams and the joint 24. Instead of having both of the seam edges provided with a layer of chlorinated rubber, as in Figure 4, only one edge will be so formed, in some cases, and this will be likewise true where either the can body or the can end is provided with an overall facing of the chlorinated rubber. However, it is preferred to have the seam sealed by combining and uniting the respective layers upon the body seam edge and the can end seam edge, although as stated a single layer provided upon one seam edge is satisfactory.

Referring to Figure 5, I have shown a body 19' of paper in which the lining 20 is omitted, but the can end 22 which is preferably of metal is provided with a coextensive layer of chlorinated rubber 20'. In this construction, as previously stated, the edge 21 may have a layer of chlorinated rubber, as shown in Figure 4, or the seal may be formed by the portion 23 continuous with the layer 20'. The can end 22 may likewise be of paper.

In Figure 6 I have illustrated in detail a bottom seam of a container as shown in Figures 2 and 5, and it will be noted that the edges a and b and the joint 24 are sealed by the layer of chlorinated rubber, the seam being formed by a single layer of chlorinated rubber applied to the edge portion of the metal or paper can bottom 22. As stated, such seam may be formed after the manner of Figure 4 or with the sealing edge 21 only provided with a layer of the chlorinated rubber.

In Figures 7 and 8 I have illustrated a metal or paper can end 26 having a groove 27 into which is flowed a solution of chlorinated rubber in a suitable solvent, such as carbon tetrachloride, chloroform, or both. When the groove has been provided with a layer of the chlorinated rubber to the proper depth, as shown in Figure 7 at 28, a mild heat is applied so that excess solvent is evaporated, leaving a homogeneous plastic film in which the chlorinated rubber is present throughout the thickness of the coating. Other types of flowable chlorinated rubber solutions may be used, and the one mentioned is purely exemplary but indicates how, in the case of sanitary cans, it is possible to employ chlorinated rubber as the sealing material for the seam.

The construction shown in Figures 7 and 8 may be utilized with any of the metal or paper containers described, and the can body may or may not have on its sealing edge 21 a layer of the chlorinated rubber. In view of the plastic nature of the sealing material 28 in the groove 27, it is not necessary that the can body be constructed with its edge provided with a layer of chlorinated rubber in order to form a seal for the seam, but the presence of such a layer is not objectionable and in fact may enhance the sealing of the seam and the joint 24. The plastic film 28 in the groove 27 is firm but may be rendered tacky under mild heat, resuming its non-tacky state upon cooling.

It will be understood that the chlorinated rubber solution may be employed for coating the can body or the can end, whether the same be of paper or metal, and a plastic homogeneous film in which the chlorinated rubber is present throughout the thickness of the coating, is produced by evaporating the solvent as described. This film likewise on cooling will be firm and non-tacky, but is rendered tacky by the application of heat and will resume its non-tacky state on cooling.

The sealing material will be used with various types and shapes of containers to seal the joints therein, whether at the top, bottom or sides, and the sealing layer 23 may be continuous with a protective layer 20—20' or simply applied to the joint or seam surfaces as in Figure 4.

It will be noted that the container blanks may be readily severed from sheets or strips of the composite material and formed into the desired shapes, since the chlorinated rubber film or layer is stable, permitting punching and forming to readily be accomplished. Thereafter, the seaming or joining operations will take place and the adhesive and sealing portions 23 of chlorinated rubber may be rendered sufficiently tacky to form a tight and durable seal.

The nature of the sealing layer 23 between the joint or sealing surfaces is such that it adheres to both surfaces, forming a continuous seal and joining the two surfaces. Where the sealing layer is upon both of the edge portions of the joint, the adjacent laminae of chlorinated rubber will adhere to each other, likewise forming a joint wherein the edge surfaces are united together and sealed by the chlorinated rubber material.

By chlorinated rubber I mean a material known in the art and described, for example, in patents to Gebauer-Fuelnegg and Moffet, No. 1,980,396, November 13, 1934, and Calvert, No. 1,989,632, January 29, 1935, or any other chlorinated rubber materials or rubber-like materials capable of forming an adherent film having the resistant protective qualities described and also capable of being rendered adherent and of acting as a sealing means.

Other types of chlorinated rubber, or rubber, may, of course, be used; for example, such as are disclosed in the following patents: 1,751,817, Jones et al., Mar. 25, 1930; 1,919,766, Beal, July 25, 1933; 1,519,659, Bradley, Dec. 16, 1924.

I prefer a chlorinated rubber which has been suitably treated to render the same substantially transparent and devoid of taste or odor. Materials of this character are old and well known as such.

I claim:

1. A package comprising a container having a body made from a metallic blank with the entire interior surface thereof which is in contact with the contents to be packaged, coated with a homogeneous composition of chlorinated rubber adherent to the body and in the form of a film of chlorinated rubber throughout its thickness, said container having a seam, the interior of which is coated and sealed by a layer of chlorinated rubber, the chlorinated rubber being present throughout the thickness of the sealing layer.

2. A metal container having a seamed or folded joint, and a sealing material for said joint, said sealing material comprising a homogeneous composition of chlorinated rubber adherent to the joint surfaces and in the form of a film of chlorinated rubber throughout its thickness, the interior of the joint being coated and sealed by a layer of said chlorinated rubber and the latter being present throughout the thickness of the sealing layer.

3. A container body made from a metallic blank with substantially the entire interior surface thereof which is to be in contact with the contents to be packaged, coated with a homogeneous composition of chlorinated rubber adherent to the body and in the form of a film of chlorinated rubber throughout its thickness, said container having an end seaming flange, substantially the entire sealing surface of said flange being coated by a layer of chlorinated rubber, the chlorinated rubber being present throughout the thickness of the layer.

CHARLES E. McMANUS.